June 9, 1936.　　G. H. GREIMAN　　2,043,479
LIFTING JACK
Filed May 15, 1935
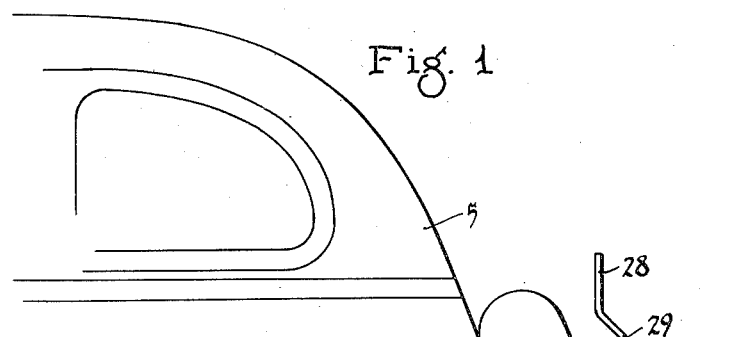
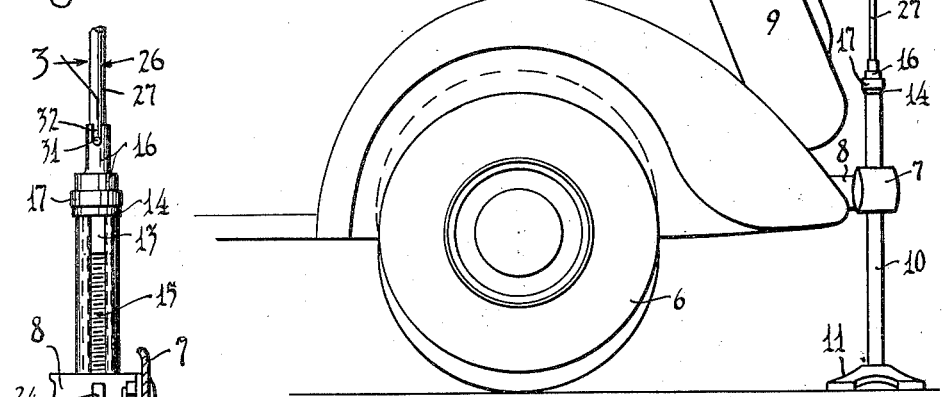
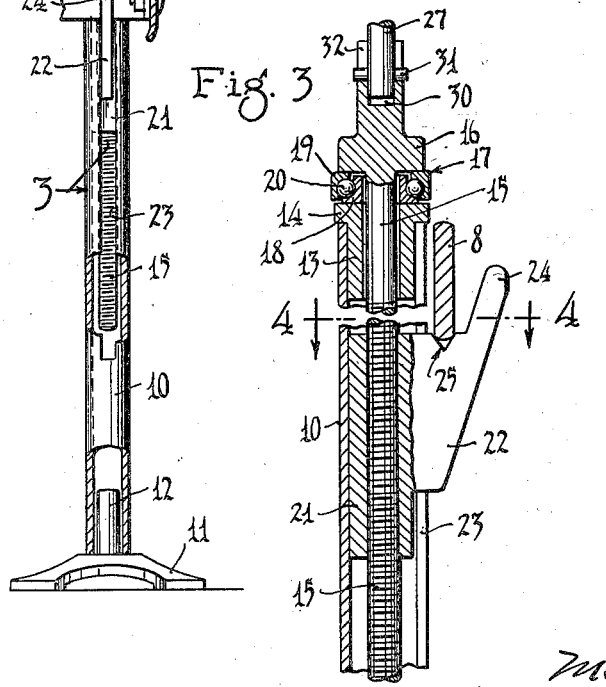
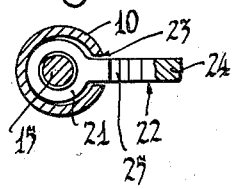
INVENTOR
George H. Greiman
By His Attorneys Patented June 9, 1936

2,043,479

UNITED STATES PATENT OFFICE 2,043,479

LIFTING JACK

George H. Greiman, Garner, Iowa

Application May 15, 1935, Serial No. 21,558

1 Claim. (Cl. 254—100)

This invention relates to lifting jacks intended for general use but especially designed for use in connection with automobiles when applying a tire thereto or removing the same therefrom.

It is well-known that it is very difficult to place an ordinary automobile lifting jack under either the front or rear axle of the present type of automobile due to the peculiar type of body and fender structures. Furthermore, the clearance between the road and axle, having a wheel with a flat tire, is such as to increase the difficulty of placing an ordinary lifting jack under the respective axle. In fact, it is almost necessary to lie down on the ground in order to place an ordinary lifting jack under either axle of an automobile.

The object of my present invention is the provision of an extremely simple and highly efficient lifting jack designed to engage either one of the bumper brackets, or other part of an automobile, outwardly of its body, whereby the jack may be placed on the road with its lifting member positioned to engage a bumper bracket, or other part of an automobile, and the jack manipulated by the operator while in a standing position and without having to stoop over.

Other objects of the invention will appear from the following description.

To the above end, generally stated, the invention consists of the novel devices and combinations of devices hereinafter described and defined in the claim.

In the accompanying drawing, which illustrates the invention, like characters indicate like parts throughout the several views.

Referring to the drawing:

Fig. 1 is a view in side elevation fragmentarily illustrating an automobile and also showing in side elevation the improved lifting jack applied to the rear left hand bumper bracket of the automobile;

Fig. 2 is a view of the improved lifting jack together with a portion of the bumper and its respective bracket, with some parts broken away and other parts sectioned;

Fig. 3 is a fragmentary view partly in side elevation and partly in section taken on the line 3—3 of Fig. 2, on an enlarged scale; and Fig. 4 is a detail view partly in plan and partly in transverse section taken on the line 4—4 of Fig. 3.

Of the parts of the automobile illustrated, it is important to note the body 5, the rear left hand wheel 6, the rear bumper 7, the rear left hand bumper bracket 8, and the spare tire 9.

Referring now in detail to the improved lifting jack, the numeral 10 indicates an upright tubular body member removably mounted on a base 11, having an upstanding central stud 12 extending into the open lower end of the body member 10 and holding said body member with freedom for slight wobble movement. A bushing 13 is secured in the open upper end of the body member 10 by a pressed fit and which bushing has on its upper end an annular collar 14 that rests on the upper end of said body and supports the bushing 13 therefrom. Extending axially through the bushing 13 and into the body member 10 is a lifting screw 15 having a radially expanded head 16 on its upper end. Interposed between the head 16 and the bushing 13 is an anti-friction bearing 17 which includes a lower ball race 18 resting on said bushing, an upper ball race 19 on which the head 16 is supported, and balls 20 interposed between said two races.

Applied to the lifting screw 15 is a long cylindrical nut-acting member 21 having a radially projecting supporting member 22 which extends through and works in a longitudinal slot 23 in the body member 10. It is important to note that there is sufficient clearance between the lifting screw 15 and the bushing 13 and the bearing 17 to permit slight wobble movement of said screw in the body member 10. It is also important to note that there is good working clearance between the nut-acting member 21 and the body member 10, as well as between the supporting member 22 and the longitudinal edges of the body member 10, at its slot 23. On the upper outer corner of the supporting member 22, radially spaced from the body member 10, is an upstanding retaining finger or hook 24. Formed in the upper end of the supporting member 22, between its finger 24 and the body member 10, is a V-shaped retaining notch 25.

Removably applied to the lifting screw 15, for retaining the same, is a hand-crank 26 comprising an upright body portion 27, an upright handle 28, and a crank portion 29 connecting the lower end of said handle to the upper end of the body portion 27. Said handle 28 is parallel to the body portion 27 and the crank portion 29 is upwardly and outwardly inclined from said body portion. Extending axially into the upper end of the body member 10 is a socket 30 into which the lower end portion of the crank body portion 27 extends and holds the same axially aligned with the lifting screw 15. The crank 26 is detachably connected to the lifting screw 15 for common rotation by separable connection comprising a transverse pin 31 in the crank portion 27 and a pair of diametrically opposite notches 32 in the head 16 into which the end portions of said pin extend.

To raise the automobile body 5, by means of the improved lifting jack and thereby lift the wheel 6 sufficiently to permit its tire to be removed or replaced, said jack is positioned, as shown in Fig. 1, with its body member close to the bumper bracket 8 and with its supporting member 22 under the same. Next, the crank 26 is operated to rotate the lifting screw 15 in the proper direction to cause its nut-acting member 21, which is held against rotation by the supporting member 22 in the slot 23, to move upwardly on said screw and thereby bring the retaining notch 25 into interlocking engagement with the lower edge portion of the bumper bracket 8. In case the bumper bracket 8 should slip out of the retaining notch 25, during the lifting of a load, said lifting jack will be securely held relative to the bumper bracket 8 by means of the body member 10 and the retaining finger 24.

Obviously, the load on the supporting member 22 will hold the back of the nut-acting member 21 in sliding contact with the body member 10, see Figs. 3 and 4, and at which time said nut-acting member affords a shoe and relieves the lifting screw 15 from lateral strains so that the only strain on said screw is a pulling strain. The slight wobble movement of the lifting screw in the body member 10 permits radial movement of the nut-acting member 21 into and out of engagement with said body member without placing any lateral strain on the lifting screw 15.

In case the base 11 settles during the lifting of the load, the play between the stud 12 and the body member 10 will permit such movement of the base 11 without tilting the body member 10.

By carrying the load on the lifting screw 15 below its supporting member instead of above the same prevents buckling of said screw and permits the use of a screw of a much smaller diameter.

By detachably holding the base 11 to the body member 10, it is possible to place said base on the ground and then mount the body member 10 thereon by inserting the same endwise through a relatively small space formed by the bumper bracket 8 or between said bracket and the bumper 7.

The peculiar shape of the hand-crank 26 permits the same to clear the spare tire 9 or a trunk, not shown, mounted on the body 5. By applying the hand-crank 26 to the upper end of the lifting screw 15, it is possible for the operator to manipulate the same while standing. During the operation of the lifting screw 15 to raise or lower the nut-acting member 21, the hand-crank 26 never changes its elevation which is an advantage in the operation of the same. By removing the base 11 and the hand-crank 26 from the body member 10, the improved lifting jack may be stored in a compact space.

The drawing illustrates a commercial form of the invention, but it will be understood that the same is capable of certain modifications as to details of construction, arrangement and combination of parts within the scope of the invention herein disclosed.

What I claim is:

In a lifting jack a tubular column adapted to be supported on its lower end, said column having a longitudinal slot at one side only, a nut-acting sleeve working within said tubular column and having a lifting lug projecting through the slot of said column, a thrust bearing mounted at the upper end of said column, a screw rod supported for slight swinging movement from the upper end of said column by said thrust bearing with its lower portion working with threaded engagement through said nut-acting sleeve within the column, the nut-acting sleeve being freely suspended on said screw rod and the lower portion of said screw rod being free for slight lateral movement, and means to rotate said screw rod in said thrust bearing, whereby under the weight of a load on said lifting lug said sleeve will be pressed against the interior of said tubular column at a point diametrically opposite the slot thereof.

GEORGE H. GREIMAN.